Jan. 16, 1951     S. POJE     2,538,589
BASE MAKING APPARATUS
Filed June 28, 1946
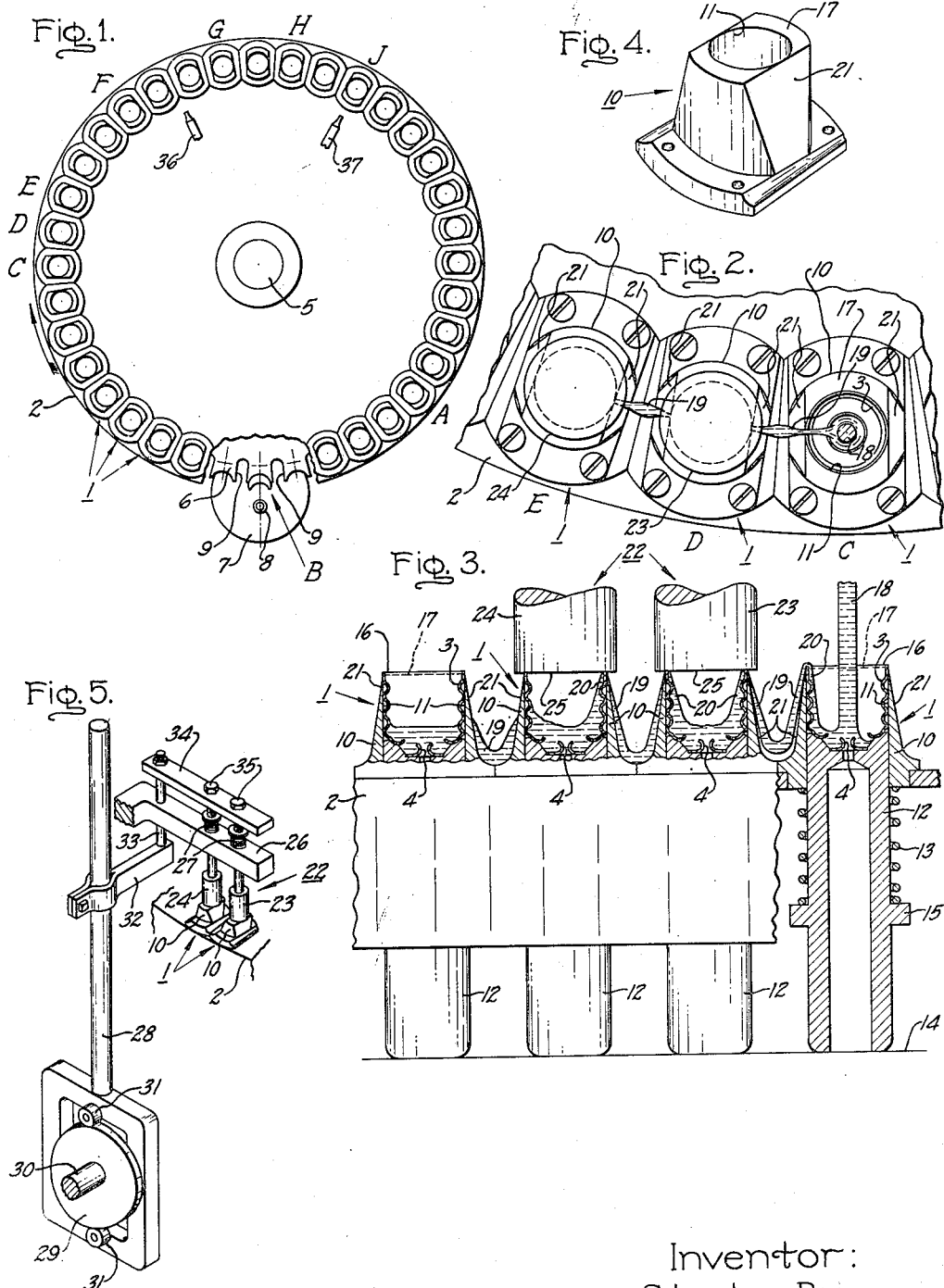
Inventor:
Stanley Poje,
by John J Anderson
His Attorney.

Patented Jan. 16, 1951

2,538,589

UNITED STATES PATENT OFFICE 2,538,589

BASE MAKING APPARATUS

Stanley Poje, Conneaut, Ohio, assignor to General Electric Company, a corporation of New York Application June 28, 1946, Serial No. 680,337

4 Claims. (Cl. 49—2)

My invention relates to apparatus for making bases for electric incandescent lamps and similar devices, and more particularly to apparatus for molding the glass insulation therein.

The conventional type of machine for molding the glass insulation into incandescent lamp bases consists of an intermittently rotating turret carrying a series of upright molds which hold the base shell and eyelet in position for molding and which are successively carried by the turret to a charging station where the shell is partly filled with molten glass from a continuous free-falling stream of molten glass from the furnace. As the molds are indexed away from the charging station, the glass stream lays a connecting string of glass between the projecting edges of the base shells in the molds. Heretofore, this string of glass was severed by means of one or more flat-surfaced cutters which were moved down against the edge of the base shell, such severance of the glass string serving to allow the glass lying against the inside of the base shell to flow down and unite with the remainder of the glass at the bottom of the mold. However, in conventional types of machines heretofore in use wherein the base-carrying molds were formed with relatively wide flat-surfaced upper ends which adjoined one another along the center line of movement of the molds to thereby provide a continuous horizontal surface between adjacent molds, a considerable percentage of these glass strings were not actually severed at the edge of the base shell, thus causing a string of glass to lie against the inner side of the shell. This string of glass within the shell became solidified on cooling, causing defective bases. Moreover, with such prior constructed molds, the base shells were generally supported in the molds with their top edges projecting a considerable distance, for instance, 1/8 inch or so, above the upper ends of the molds in order to allow the connecting strings of molten glass to be draped over the edges of the shells and to provide sufficient space for the accommodation of the glass strings between the aforementioned cutters and the upper ends of the molds. As a result of such appreciable projection of the base shells above the upper ends of the molds, the projecting edge portions of the shells would be frequently crushed by the downwardly moving cutters, particularly when the latter would get out of adjustment.

It is an object of the present invention therefore to provide base making apparatus of the above mentioned type which will produce bases uniformly free of glass strings on the inner side of the base shell.

Another object of my invention is to provide base making apparatus of the above mentioned type which will operate to positively sever the connecting glass strings which are laid between the molds during the base forming operation.

Still another object of my invention is to provide base making apparatus of the above mentioned type which will produce bases uniformly free of glass strings and which will not crush the edge portions of the base shells.

Further objects and advantages of my invention will appear from the following description of a species thereof and from the accompanying drawing in which:

Fig. 1 is a plan view of the mold carrier of base-making apparatus comprising my invention; Fig. 2 is a fragmentary plan view of the said mold carrier showing the molds at and immediately following the glass charging station;

Fig. 3 is a side elevation, partly in section, of the portion of the apparatus illustrated in Fig. 2 but with the molds shown in linearly, rather than circularly arranged relation in order to better illustrate the invention; Fig. 4 is a perspective detail view of one of the molds comprising my invention; and Fig. 5 is a diagrammatic perspective view of the operating mechanism for the glass string cutters at stations D and E.

In the drawing, there is shown, for illustrative purposes, a machine of the general type described in prior patents to Walker et al. Nos. 1,210,237 and 1,210,238 and comprising a plurality of molds 1, herein thirty-six in number, carried upon a turret 2 or other mold carrier which serves to present the molds in succession to the several operating mechanisms of the machine. The molds 1 are circularly arranged about the periphery of the turret 2 and are adapted to hold in proper relation with each other the metal shell 3 (Fig. 3) and the perforated metallic center contact or eyelet 4 of the base to be formed. The mold carrier or turret 2 is mounted on a vertical shaft 5 to rotate in a horizontal plane, and it is given an intermittent or step-by-step clockwise movement (in the particular case at an index speed of around 200 per minute) by any suitable means so as to present each mold in succession to feeding devices for inserting the base shell 3 and eyelet 4 into the molds, a charging device for introducing a charge of molten glass into the mold, compressing means for compressing and forming the molten glass in the mold, a clearing device to clear the perforation of the eyelet, and finally to lifting means and cooperating means for removing the completed base from the mold, all of which mechanisms are well known and are not shown in the drawing. The movement is such that the mold carrier is caused to momentarily dwell for an interval between each movement to permit the several operations to take place simultaneously upon the base or base parts in different molds of the series. The indexing movement of the mold carrier or turret 2 may be effected by a Geneva gear drive, for instance, comprising a Geneva wheel 6 fastened on the turret shaft 5 and meshing with a rotating Geneva drive gear 7 carrying a roller 8 which engages in the slots 9 of the wheel 6 to thereby rotate the latter.

As shown in particular in Figs. 2-4, each mold 1 comprises a shell holder or die cap 10 fixed to and upstanding from the turret 2 and having an upwardly opening cylindrical cavity or bore 11 for receiving and holding upright the shell part 3 of the base to be formed. The mold 1 further comprises a vertically movable plunger-like bottom or die 12 shaped to receive the bottom of the shell 3 and supporting the latter in place in the mold, and to hold also in appropriate relation to the shell the perforated metallic center contact or eyelet 4 of the base to be formed. The mold bottom or plunger 12 is normally depressed by a compression coil spring 13 to a fixed lowered position, as determined by the engagement of the lower end of the plunger with a cam track 14 mounted on the base of the machine and on which the plungers ride during their travel around the machine. The spring 13 is compressed between a collar 15 on the plunger 12 and the lower end of the shell holder 10. In its said lowered position, the mold bottom 12 supports the base shell 3 with its upper edge 16 projecting a slight distance, for instance .020 inch or thereabouts, above the upper end 17 of the shell holder 10, as shown in Fig. 3.

Referring to Fig. 1, the metal eyelets 4 and shells 3 are fed into the molds 1 at stations A and B, respectively, by any suitable feeding mechanism, such as that described and claimed in the above mentioned Walker et al. patents, for instance. The molds containing the base shells and eyelets are then indexed to station C where they receive a charge of molten glass from a continuous freely-falling stream of molten glass 18 from a furnace (not shown). As the molds 1 are moved into and away from the glass stream 18 at station C, the said stream lays a connecting string of glass 19 between the edges of the base shells 3 in the molds. These glass strings 19 must be severed at the edges 16 of the base shells in order to permit the portions 20 thereof laying against the inner side of the shell to fall down into the bottom of the mold and unite with the remainder of the glass in the mold bottom, since otherwise this portion of the glass string within the shell would solidify on cooling and cause a defective base.

In accordance with the invention, the severance of the glass strings 19 is effectively assured by the use of a shell holder of special construction in conjunction with the conventional cutters heretofore employed for such string-cutting purpose. The shell holders 10 according to the invention have their upstanding walls shaped to provide gaps or openings between successive holders of sufficient depth and width to permit the glass strings 19 to drop freely between the holders while hanging from the upper edges of the base shells in said holders. For this purpose, each shell holder 10 may have those portions of its outer side wall which face the adjacent holders on either side, tapered upwardly and inwardly so as to intersect the inner or cavity wall 11 of the holder at the upper end thereof. In the particular case illustrated, the shell holders 10 are each formed with flat outer side wall portions 21 extending more or less radially of the turret 2 (i. e., transversely of the path of movement of the molds) and converging upwardly to intersect the cylindrical inner wall 11 of the holder at the upper end thereof. The facing tapered sides 21 of successive holders 10 thus provide intervening U-shaped gaps or openings having upwardly diverging sides which serve to progressively widen or enlarge the gaps upwardly. The said gaps or openings are of sufficient depth in relation to their width or span at the top (for instance, from 1½ to 2 times the width) to allow the glass strings 19 to hang or be suspended directly from the edges 16 of the base shells and to drop freely an appreciable amount, while so suspended from the shell edges, until they come to rest against the tapered sides 21 and bottoms of the openings. In the particular case illustrated, the depth of the intervening gaps or openings is approximately 1⅛ inches or around 1⅔ times their width (¹¹/₁₆ inch) at the top. With such a spacing of the shell holders 10, the glass stream 18, when flowing at a rate of around 120 pounds per hour in a stream of approximately $\frac{3}{16}$ inch diameter, will lay a connecting string of glass 19 between the base shells 3 which will bridge or span the gap between the upper edges 16 of the shells when the latter are indexed from one station to the next in an actual travel time (i. e., exclusive of dwell) of around 0.13 second by the Geneva gear drive.

As a result of their being free to drop while suspended from the shell edges 16, the glass strings 19 are thinned out or attenuated by gravity at and immediately adjacent the shell edges 16, the glass strings thus tending to sever themselves of their own weight. The angle or inclination of the tapered outer side wall portions 21 of the shell holders 10 is preferably made sufficiently steep, for instance around 10 degrees or so with respect to the vertical, to allow the glass strings 19 to drop the full depth of the gaps or openings between the holders before they engage the tapered sides 21 thereof. In this way, the maximum amount of attenuation of the glass strings 19 is assured for a given depth of opening between the holders 10. The fact that the glass strings 19 are free to drop while suspended from the shell edges 16 also permits the shells 3 to be supported in the shell holders 10 with a minimum projection (.020 inch for instance) of the shells above the upper ends 17 of the shell holders, thus eliminating crushing of the shell edge portions by the cutters 23, 24.

To assure positive severance of the attenuated glass strings 19, additional cutter means 22 are provided at one or more of the stations immediately following the glass charging station C. While in the particular case illustrated I have shown the additional cutter means located at the two stations D and E immediately following the glass charging station C, they may in certain cases be located at other of the stations closely following the glass charging station, such as the second and third stations for instance. The particular cutter means 22 shown in the drawing may be of the conventional type heretofore in use on machines of this character and comprising separate cutters 23, 24 located at stations D and E, respectively, and having flat undersurfaces 25 which are moved down against the edges 16 of the base shell to thereby squeeze and sever the glass strings 19. The first cutter 23 may be internally water-cooled so as to chill the portions of the glass strings resting on the base shell edges 16 and transform the said glass string portions into a condition more favorable to ready severance by the cutter 24 at the following station E.

The cutters 23, 24 are carried by and vertically reciprocable within a bracket 26 (Fig. 5) fastened to a stationary part of the machine, and they are normally held in a raised position by the expansive force of the compression coil springs 27 surrounding the cutters. The downward movement of the cutters 23, 24 into engagement with the shell edges 16 may be effected by any suitable means operating in timed relation with the dwell of the turret 2, such as by a vertically extending rod 28 mounted adjacent the periphery of the turret and vertically reciprocated by a plate cam 29 mounted on a cam shaft 30 which is gear driven from the main drive shaft (not shown) of the machine. At its lower end, the cam follower rod 28 carries a pair of rollers 31, 31, which ride on the periphery of the cam 29 at diametrically opposite sides thereof. The rod 28 carries an arm 32 which is fastened to a vertical connecting rod 33 extending up through the bracket 26 and carrying at its upper end an arm 34 which overlies the upper ends of the cutters 23, 24. The arm 34 is provided with adjustable screws 35, 35 vertically aligned with the cutters 23, 24 and engaging with the upper ends thereof, upon downward movement of the arm 34, to thereby force the cutters down into engagement with the shell edges 16.

Upon severance of the glass strings 19 between the base shells 3, the portions 20 thereof inside the shells are then free to fall down into the bottom of the molds and unite with the remainder of the molten glass thereat. The molds are then indexed to the forming station F where a vertically reciprocable forming plunger (not shown) moves down into the base shell and compresses the molten glass therein to thus form the glass web or button of the finished base. The downward movement of the forming plunger into the base shells 3 pulls or draws down into the bottom of the molds any glass string portions 20 lying against the inner sides of the base shells. The severed glass strings 19 are removed from between the molds 1 by any suitable means, such as by a continuous air blast from a nozzle 36 (Fig. 1), which may be located adjacent the path of travel of the molds from the station following the forming station F and directed more or less radially outward of the turret 2. The web of glass in the base is then further formed at station G by an auxiliary forming plunger located at said station, after which the perforation in the base eyelet 4 is then cleared of glass at station H by means of a vertically reciprocable punch (not shown) at said station. The completed bases are finally ejected from the molds 1 at station J by any suitable means, such as by the mold bottoms or plungers 12 riding up a rise in the cam track 14 to thereby lift the bases out of the shell holders 10 and a blast of air being directed against the raised bases by an air nozzle 37 to thereby blow the bases out of the molds and into a suitable storage receptacle located alongside the turret 2.

What I claim as new and desire to secure by Letters Patent of the United States is:

1. A lamp base-making machine comprising a movable carrier having a series of upright molds thereon and arranged to move said molds in a horizontal plane progressively beneath a free-falling stream of molten glass, said molds each comprising a shell holder having a vertically extending cavity for receiving and holding a base shell upright, the opposing wall portions of successive holders diverging upwardly to define upwardly enlarged openings therebetween of sufficient depth and width to permit the glass strings deposited between successive holders to drop freely therebetween and become attenuated at their opposite ends.

2. A lamp base-making machine comprising a movable carrier having a series of upright molds thereon and arranged to move said molds in a horizontal plane progressively beneath a free-falling stream of molten glass, said molds each comprising a shell holder having a vertically extending cavity for receiving and holding a base shell upright, the opposing outer wall portions of successive holders being tapered upwardly and inwardly of the holders at a steep angle to intersect and form a sharp edge with the cavity walls of the holders and being spaced to define openings therebetween of sufficient depth and width to permit the glass strings deposited between successive holders to drop freely therebetween and become attenuated at their opposite ends.

3. A lamp base-making machine comprising a movable carrier having a series of upright molds thereon and arranged to move said molds in a horizontal plane progressively beneath a free-falling stream of molten glass, said molds each comprising a shell holder having a vertically extending cavity for receiving and holding a base shell upright, said holder having flat opposite outer side wall portions extending transversely of the path of movement of the mold and converging upwardly at a steep angle to intersect the wall of said cavity.

4. A lamp base-making machine comprising a movable carrier having a series of upright molds thereon and arranged to move said molds in a horizontal plane progressively beneath a free-falling stream of molten glass, said molds each comprising a shell holder having a vertically extending cavity for receiving and holding a base shell upright with its upper edge projecting upwardly beyond the upper end of the holder, the opposing outer wall portions of successive holders being tapered upwardly and inwardly of the holders at a steep angle to substantially intersect the cavity walls of the holders and being spaced to define openings therebetween of sufficient depth and width to permit the glass strings deposited between successive holders to drop freely therebetween while suspended from the projecting upper edges of the shells in said holders, and a cutting tool located adjacent the path of travel of the molds from the stream of molten glass and vertically movable down into engagement with the projecting upper edges of the shells to sever the molten glass strings deposited thereacross by the said glass stream.

STANLEY POJE.

REFERENCES CITED

The following references are of record in the file of this patent:

UNITED STATES PATENTS

| Number | Name | Date |
|---|---|---|
| 796,470 | Swan | Aug. 8, 1905 |
| 2,116,450 | Richardson et al. | May 3, 1938 |
| 2,315,292 | Richardson et al. | Mar. 30, 1943 |